3,499,884
NUCLEATION OF 1-OLEFIN POLYMERS
WITH NYLON SALTS
Harold V. Wood, Bartlesville, Okla., assignor to Phillips Petroleum Company, a corporation of Delaware
No Drawing. Filed Feb. 10, 1967, Ser. No. 615,079
Int. Cl. C08f 1/88, 45/00
U.S. Cl. 260—94.9
6 Claims

ABSTRACT OF THE DISCLOSURE

The crystal structure of 1-olefin polymers is altered by the addition of a small concentration of a nylon salt. By nylon salt is meant the product formed on reacting a diamine such as hexamethylene diamine with a diacid such as adipic acid.

---

This invention relates to the nucleation of polymers of at least one 1-olefin, said 1-olefin having 2 to 8 carbon atoms per molecule, with salts of dicarboxylic acids and organic diamines.

Frequently it has been found desirable to modify the crystalline structure of the various olefin polymers. In particular with such relatively new members of this class of polymers as high density polyethylene and polypropylene, it has been found possible to greatly alter the physical properties by adding various materials to the polymer to nucleate the formation of crystals. This is because in many of these polymers, large crystal structures known as spherulites form on cooling the polymers to a point below their crystalline freezing point. The addition of nucleating agents results in the formation of a crystal structure which is substantially free of large spherulites. This results in a polymer with physical properties which are better suited for certain applications. For instance, it results in a polymer having greater transparency which is desirable in many film applications. Also it results in a polymer of increased flexural modulus or stiffness which makes possible the fabrication of parts of thinner cross-section, having rigidity comparable to those made from thicker sections of polymer not containing a nucleating agent.

Several materials have been disclosed in the prior art as being of varying degrees of value as nucleating agents for certain polymers. While some effort has been made to characterize the type of agents which are effective—see for instance J. Polymer Science, vol. 39, page 544, (1959)—for the most part the reason some materials are effective and others are ineffective has gone unexplained except that it is generally thought that the nucleating agent must have a higher melting point than the base polymer so that it can provide solid particles around which the polymer crystals can form. Some materials will function as nucleating agents for polypropylene, for instance, but are ineffective in polyethylene. Materials proposed to date as nucleating agents include certain finely divided inorganic materials, polycarboxylic acids, and even other polymers.

It is an object of this invention to provide 1-olefin polymers with improved physical properties.

It is a further object of this invention to provide 1-olefin polymers with improved optical properties.

It is a still further object of this invention to provide 1-olefin polymers with increased flexural modulus.

It is yet a further object of this invention to provide 1-olefin polymer compositions suitable for fabricating into products of improved optical and other physical properties.

It has now been found that another class of compounds, nylon salts of dicarboxylic acids, function as nucleating agents. Furthermore these salts have been found to have a greater nucleating effect, as indicated by improved physical properties, than nylon polymers which are now generally considered to be nucleating agents.

By nylon salt is meant the salt resulting from the reaction of a diamine and a dicarboxylic acid. These are true salts in the technical sense of the word, as opposed to the polymer which would be formed if the reaction mixture was heated more. The dicarboxylic acids suitable for forming the salts of this invention include aliphatic and aromatic acids having from 2 to 18 carbon atoms per molecule. Examples of suitable acids include phthalic acid, malonic acid, oxalic acid, glutaric acid, adipic acid, pimelic acid, suberic acid, azelaic acid, sebacic acid, 1,2-cyclohexanediacetic acid, tetradecanedioic acid, dodecanedioic acid, diphenic acid, octadecanedioic acid, and the like. Suitable organic diamines include those having from 2 to 10 carbon atoms per molecule, preferably hexamethylenediamine. Examples of other suitable diamines include ethylenediamine, tetramethylenediamine, pentamethylenediamine, octamethylenediamine, decamethylenediamine, para-xylylenediamine, 3-methylhexamethylenediamine, 2,2,4-trimethylhexamethylenediamine, piperazine, and the like.

These salts can be prepared by methods well known in the art. For instance, a methanol solution of the diacid and a methanol solution of the diamine can be poured together and the resulting insoluble salt recovered by filtration. Since most diacids are not very soluble in methanol at room temperature, a preferred procedure is to pour a methanol solution of the diamine into a methanol slurry of the diacid. Other suitable solvents and diluents can be used. No special procedure is necessary except that if no other cooling methods are used sufficient solvent should be present to allow dissipation of the heat; if too little solvent is present and no other cooling methods are used the heat generated by the reaction may boil off all of the solvent.

Applicable 1-olefin polymers for use in the practice of this invention include polymers of 1-olefins having from 2 to 8 carbon atoms per molecule preferably homopolymers and copolymers of ethylene, propylene, and butene, more preferably polypropylene and high density ethylene polymers. These polymers can be produced by any of the methods well known in the art. A particularly suitable polymerization method for preparing olefin polymers and copolymers for use in the instant invention is that described in U.S. 2,825,721 to Hogan et al. Another suitable method for preparing olefin polymers and copolymers for use in the instant invention is that utilizing the well-known organometal catalyst systems comprising a transition metal compound such as a titanium halide and a reducing compound such as an aluminum alkyl.

The nylon salts can be incorporated into the polymers by any known manner such as by melt blending, dry blending or solution blending. The concentration of salt can be very low, for instance between 0.005 and 1 weight percent based on the weight of the polymer, preferably between 0.01 and 0.1 weight percent.

In order to effect the modification of crystal structure, the polymer must be crystallized from the melt phase. If melt blending is used, then the modified crystal structure will result on the initial cooling. If a technique such as dry blending is used, the polymer must be melted and then recrystallized; this is of no disadvantage however since the polymer will generally be melted during the fabrication step. Of course the polymer can be melted and recrystallized a number of times if desired.

The polymer can contain other additives such as antioxidants, UV stabilizers, pigments, and the like.

EXAMPLE I

Polypropylene was prepared using a diethylaluminum chloride-$TiCl_3 \cdot 1/3 AlCl_3$ catalyst. This polymer had a melt flow (ASTM D 1238–62T, Condition L) of 4.1. Salts which formed on mixing methanol solutions of the diacids and diamines shown in the following table were blended with this polymer in a Brabender Plastograph at 70 r.p.m. for 5 minutes at 190° C. under a nitrogen atmosphere. The procedure used in forming these salts was as follows. A slurry of the diacid in methanol was made at room temperature, the diacid being present in an amount equal to 1.5 mols per liter of methanol. To one part by volume of this slurry was added about 0.25 part by volume of a solution of the diamine, the concentration of said diamine being such as to give about a 2 mol percent excess of diamine. On mixing, heat was evolved as the salt was formed. The reaction mixture was allowed to cool and the salt recovered by filtration.

Flexural modulus of compression molded samples of the control and the various samples containing the salts was determined by ASTM D 790–63. The concentration of the additive was 0.1 weight percent based on the weight of the polymer except in Run 2 where it was 0.2 percent. The results are reported in Table I.

TABLE I

| Run No. | Salt | Flexural modulus |
| --- | --- | --- |
| Control A | None | 209,000 |
| Control B | Nylon 6-6 polymer (Zytel 63) | 228,000 |
| 1 | Hexamethylenediamine+adipic acid | 258,000 |
| 2 | do | 251,000 |
| 3 | Hexamethylenediamine+1,12-dodecanedioic acid | 261,000 |
| 4 | Hexamethylenediamine+sebacic acid | 260,000 |
| 5 | Hexamethylenediamine+terphthalic acid | 241,000 |

A comparison of the flexural modulus of the control run A containing no additive with the control run B containing nylon polymer and with Runs 1–4 reveals that, while a modest improvement in flexural modulus is obtained through the use of the nylon polymer as taught in the art, a significantly greater improvement is attained utilizing the nylon salts.

EXAMPLE II

A portion of the polypropylene of Example I was dry blended with 0.2 weight percent of the same salt hexamethylenediammonium adipate as used in Runs 1 and 2 of Example I using a Henschel blender (a type of dry blender). The flexural modulus of a compression molded sample (ASTM D 790–63) was 252,000. These data show that the salt can be dry blended as well as melt blended.

EXAMPLE III

Ethylene homopolymer having a melt index of 0.1 (ASTM D 1238–62T, Condition E) and a density of 0.960 (ASTM D 1505–63T) was blended with salts which formed on mixing methanol solutions of the diacids and diamines shown in the following table. The blending was done in a Brabender Plastograph at 70 r.p.m. for 5 minutes at 190° C. under a nitrogen atmosphere. Flexural modulus of compression molded samples of the control and the various samples containing the salts was determined by ASTM D 790–63. Haze was determined by ASTM D 1003–61 on 12 mil samples. The specimens for haze determination were prepared by pressing the film out in a compression mold and then cooling at 25° F./minute.

TABLE II

| Run No. | Salt | Flexural modulus | Haze, percent |
| --- | --- | --- | --- |
| Control C | None | 235,000 | 86 |
| 6 | Hexamethylenediamine+adipic acid | 252,000 | 81 |
| 7 | Hexamethylenediamine+1,12-dodecanedioic acid | 252,000 | 83 |
| 8 | Hexamethylenediamine+sebacic acid | 251,000 | 76 |
| 9 | Hexamethylenediamine+terphthalic acid | 250,000 | 77 |
| 10 | Hexamethylenediamine+isophthalic acid | 248,000 | 77 |

A comparison of control C with Runs 6–10 reveals that these nylon salts are effective in polyethylene to increase flexural modulus and to reduce haze.

While this invention has been described in detail for the purpose of illustration, it is not to be construed as limited thereby but is intended to cover all changes and modifications within the spirit and scope thereof.

I claim:

1. A composition comprising: a polymer of at least one 1-olefin, said 1-olefin having from 2 to 8 carbon atoms per molecule; and from 0.005 to 1 weight percent, based on the weight of said polymer, of a nonpolymeric salt formed by the reaction of an organic diamine having 2 to 10 carbon atoms per molecule and an aliphatic or aromatic dicarboxylic acid having 2 to 18 carbon atoms per molecule.

2. A method of modifying the crystal structure of polymers of at least one 1-olefin, said 1-olefin having from 2 to 8 carbon atoms per molecule, comprising: admixing with said polymer between 0.005 and 1 weight percent, based on the weight of the polymer, of a salt formed by the reaction of an organic diamine having 2 to 10 carbon atoms per molecule and an aliphatic or aromatic dicarboxylic acid having 2 to 18 carbon atoms per molecule; and crystallizing the resulting mixture from a melt phase.

3. The method according to claim 2 wherein said polymer is a polymer of a 1-olefin selected from the group consisting of ethylene, propylene, butene, and mixtures thereof.

4. The method according to claim 2 wherein: said polymer is polypropylene; said salt is the reaction product of hexamethylenediamine and a diacid selected from the group consisting of adipic acid, 1,12-dodecanedioic acid, sebacic acid, and terphthalic acid; and said salt is present in a concentration between 0.01 and 0.1 weight percent based on the weight of polymer.

5. The method according to claim 2 wherein: said polymer is an ethylene homopolymer; said salt is the reaction product of hexamethylenediamine and a diacid selected from the group consisting of adipic acid, 1,12-dodecanedioic acid, sebacic acid, terphthalic acid, and isophthalic acid; and said salt is present in a concentration between 0.01 and 0.1 weight percent based on the weight of polymer.

6. The product prepared by the process of claim 2.

(References on following page)

References Cited

UNITED STATES PATENTS

| | | | | |
|---|---|---|---|---|
| 2,991,264 | 7/1961 | Monroe | 260— | 32.6 |
| 3,207,735 | 9/1965 | Wijga | 260— | 93.7 |
| 3,207,736 | 9/1965 | Wijga | 260— | 93.7 |
| 3,207,737 | 9/1965 | Wales | 260— | 93.7 |
| 3,207,738 | 9/1965 | Wijga | 260— | 93.7 |
| 3,207,739 | 9/1965 | Wales | 260— | 93.7 |
| 3,322,739 | 5/1967 | Hagemeyer | 260— | 88.2 |
| 3,327,020 | 6/1967 | Binsbergen | 260— | 878 |
| 3,327,021 | 6/1967 | Binsbergen | 260— | 878 |
| 3,326,880 | 6/1967 | Binsbergen | 260— | 93.7 |
| 3,359,346 | 12/1967 | Takashima | 260— | 897 |
| 3,367,926 | 2/1968 | Voeks | 260— | 93.5 |
| 3,107,228 | 10/1963 | Coppuccio | 260— | 857 |
| 3,320,334 | 5/1967 | Bonvicini | 260— | 857 |
| 3,331,888 | 7/1967 | Contatore | 260— | 857 |
| 3,361,843 | 1/1968 | Miller | 260— | 857 |

MURRAY TILLMAN, Primary Examiner

P. LIEBERMAN, Assistant Examiner

U.S. Cl. X.R.

260—857, 88.2, 93.7